(12) United States Patent
Okumura (10) Patent No.: US 10,327,555 B2
(45) Date of Patent: Jun. 25, 2019

(54) STAY FOR HEADREST

(71) Applicant: TOKAI CHEMICAL INDUSTRIES, LTD., Gifu (JP)

(72) Inventor: Takemasa Okumura, Gifu (JP)

(73) Assignee: TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 15/786,910

(22) Filed: Oct. 18, 2017

(65) Prior Publication Data

US 2018/0035808 A1 Feb. 8, 2018

Related U.S. Application Data

(63) Continuation of application No. PCT/JP2016/079038, filed on Sep. 30, 2016.

(30) Foreign Application Priority Data

Sep. 30, 2015 (JP) .................. 2015-193160

(51) Int. Cl.
*B60N 2/80* (2018.01)
*A47C 7/38* (2006.01)
*B60N 2/894* (2018.01)

(52) U.S. Cl.
CPC .................. *A47C 7/38* (2013.01); *B60N 2/80* (2018.02); *B60N 2/894* (2018.02)

(58) Field of Classification Search
CPC .. B60N 2/80; B60N 2/894; B60N 2002/4894; A47C 7/38
USPC ................................................. 297/391, 410
See application file for complete search history.

(56) References Cited

U.S. PATENT DOCUMENTS

| | | | | | |
|---|---|---|---|---|---|
| 4,693,516 A | * | 9/1987 | Knecht | .................. | B60N 2/809 297/391 |
| 4,856,848 A | * | 8/1989 | O'Sullivan | ............ | B60N 2/865 297/391 |
| 5,020,855 A | * | 6/1991 | Lindberg | ............... | B60N 2/838 297/391 |
| 5,228,749 A | * | 7/1993 | Harrell | ................... | B60N 2/847 297/391 X |
| 5,236,245 A | * | 8/1993 | Harrell | ................... | B60N 2/847 297/391 X |

(Continued)

FOREIGN PATENT DOCUMENTS

| | | |
|---|---|---|
| JP | 06/074658 | 5/1985 |
| JP | 60-74658 | 5/1985 |

(Continued)

OTHER PUBLICATIONS

Search Report issued in Patent Application No. PCT/JP2016/079038, dated Jan. 10, 2017 with English language translation.

*Primary Examiner* — Rodney B White
(74) *Attorney, Agent, or Firm* — Oliff PLC (57) ABSTRACT

A stay for headrest includes a hollow metallic stay body, and an end installation body. The stay body is formed as a letter-"U" shape including a base, and paired legs extending respectively from opposite ends of the base. The end installation body is formed of a polymeric material, and includes a solid portion arranged inside a hollow interior in a leading end portion of the paired legs, and a spherical portion protruding from the leading end portion of the paired legs.

12 Claims, 4 Drawing Sheets

(56) References Cited

U.S. PATENT DOCUMENTS

| | | | | |
|---|---|---|---|---|
| 5,236,246 A * | 8/1993 | Harrell | B60N 2/847 | 297/391 X |
| 5,238,295 A * | 8/1993 | Harrell | B60N 2/847 | 297/391 X |
| 5,445,434 A * | 8/1995 | Kohut | B60N 2/826 | 297/391 |
| 5,667,276 A * | 9/1997 | Connelly | B60N 2/815 | 297/410 |
| 5,788,250 A * | 8/1998 | Masters | B60N 2/826 | 297/410 |
| 6,068,337 A * | 5/2000 | De Filippo | B60N 2/815 | 297/391 |
| 6,631,956 B2 * | 10/2003 | Mauro | B60N 2/80 | 297/410 |
| 6,793,290 B2 * | 9/2004 | Lomagno | B60N 2/818 | 297/463.1 |
| 7,303,237 B1 * | 12/2007 | Hughes | B60N 2/882 | 297/391 |
| 7,537,282 B2 * | 5/2009 | Veine | B60N 2/888 | 297/391 X |
| 7,621,597 B2 * | 11/2009 | Oda | B29C 45/14549 | 297/391 |
| 7,735,928 B2 * | 6/2010 | Droche | B60N 2/818 | 297/391 X |
| 8,322,790 B2 * | 12/2012 | Tscherbner | B60N 2/832 | 297/410 X |
| 8,356,863 B2 * | 1/2013 | Arcidiacone | B21D 17/02 | 297/391 |
| 8,474,913 B2 * | 7/2013 | Line | B60N 2/809 | 297/391 |
| 8,517,471 B2 * | 8/2013 | Maddelein | B60N 2/865 | 297/410 |
| 8,979,205 B2 * | 3/2015 | Zimmermann | B60N 2/682 | 297/410 X |
| 9,004,803 B2 * | 4/2015 | Wanke | B60N 2/809 | 297/410 X |
| 9,776,540 B2 * | 10/2017 | Otto | B60N 2/809 | |
| 9,950,654 B1 * | 4/2018 | Contreras | B60N 2/80 | |
| 2006/0001308 A1 * | 1/2006 | Humer | B60N 2/888 | 297/410 |
| 2006/0197366 A1 * | 9/2006 | Saberan | B60N 2/829 | 297/410 |
| 2010/0270842 A1 * | 10/2010 | Mueller | B60N 2/865 | 297/410 |
| 2010/0301654 A1 * | 12/2010 | Sobieski | B60N 2/865 | 297/391 |
| 2011/0187174 A1 * | 8/2011 | Tscherbner | B60N 2/815 | 297/391 X |
| 2012/0007403 A1 * | 1/2012 | Menges | A47C 7/38 | 297/391 |
| 2012/0007404 A1 * | 1/2012 | Tscherbner | B60N 2/4814 | 297/391 |
| 2012/0025582 A1 * | 2/2012 | Humer | B60N 2/821 | 297/391 |
| 2012/0080922 A1 * | 4/2012 | Fey | B60N 2/4814 | 297/391 |
| 2012/0080923 A1 * | 4/2012 | Kunert | B60N 2/815 | 297/391 |
| 2012/0235460 A1 * | 9/2012 | Fey | B60N 2/818 | 297/410 |
| 2013/0069412 A1 * | 3/2013 | Tscherbner | A47C 7/38 | 297/391 |
| 2013/0106162 A1 * | 5/2013 | Raja K | B60N 2/3011 | 297/391 |
| 2016/0129815 A1 * | 5/2016 | Kolich | B60N 2/4864 | 297/391 |
| 2018/0022249 A1 * | 1/2018 | Schwerma | A47C 7/38 | 297/410 |

FOREIGN PATENT DOCUMENTS

| | | |
|---|---|---|
| JP | 2001-327359 | 11/2001 |
| JP | 2005-212653 | 8/2005 |
| JP | 2011-235827 | 11/2011 |
| JP | 5612989 | 9/2014 |

* cited by examiner

STAY FOR HEADREST

CROSS REFERENCE TO RELATED APPLICATIONS

The present application is a Continuation Application of International Application No. PCT/JP2016/079038, filed on Sep. 30, 2016, which is incorporated herein by reference. The present invention is based on Japanese Patent Application No. 2015-193160, filed on Sep. 30, 2015, the entire contents of which are incorporated herein by reference.

BACKGROUND OF THE INVENTION

1. Field of the Invention

The present invention relates to a stay for headrest.

2. Description of the Related Art

Japanese Unexamined Patent Publication (KOKAI) Gazette No. 2001-327359 (JP2001-327359A) sets forth a stay for headrest, the stay comprising: a hollow stay body; and a foamed resin filled in the hollow interior in the stay body. Japanese Patent Gazette No. 5612989 (JP5612989B2) sets forth that a stay body is formed by metal, and that the stay body is processed at the leading end as a spherical shape.

SUMMARY OF THE INVENTION

Incidentally, a stay for headrest has been required to have a spherical shape at the leading end, as set forth in JP5612989B2, in order to enhance the safety in case the head of a passenger sitting on a rear seat hits against the seat back of a front seat when vehicles have collided one another, for instance. Moreover, since a stay has been required to exhibit predetermined strength (e.g., predetermined flexural rigidity) against bending, a steel material has been used mainly therefor. Processing a hollow steel material at the leading end in the shape of a sphere, however, results in a factor leading to adversely making the resultant stay higher in cost.

The present invention is aimed at providing a stay for head rest, the stay capable of being manufactured inexpensively while giving the leading end a highly safe configuration.

A stay for headrest according to the present invention comprises:

a metallic hollow stay body formed as a letter-"U" shape including a base and paired legs extending respectively from opposite ends of the base;

an end installation body formed of a polymeric material, and including a solid portion arranged inside a hollow interior in a leading end portion of the paired legs, and a spherical portion protruding from the leading end portion of the paired legs.

The stay for headrest according to the present invention is made as a spherical shape at the leading end by the end installation body formed by a polymeric material. Therefore, the metallic stay body does not need to be formed as a spherical shape at the leading end. It is very easy and inexpensive to form a polymeric material as a spherical shape. Hence, it is possible to manufacture the present headrest stay inexpensively while giving the leading end a highly safe configuration.

DESCRIPTION OF THE EMBODIMENTS

First Embodiment

1-1 Construction of Headrest 1

Figure 1:
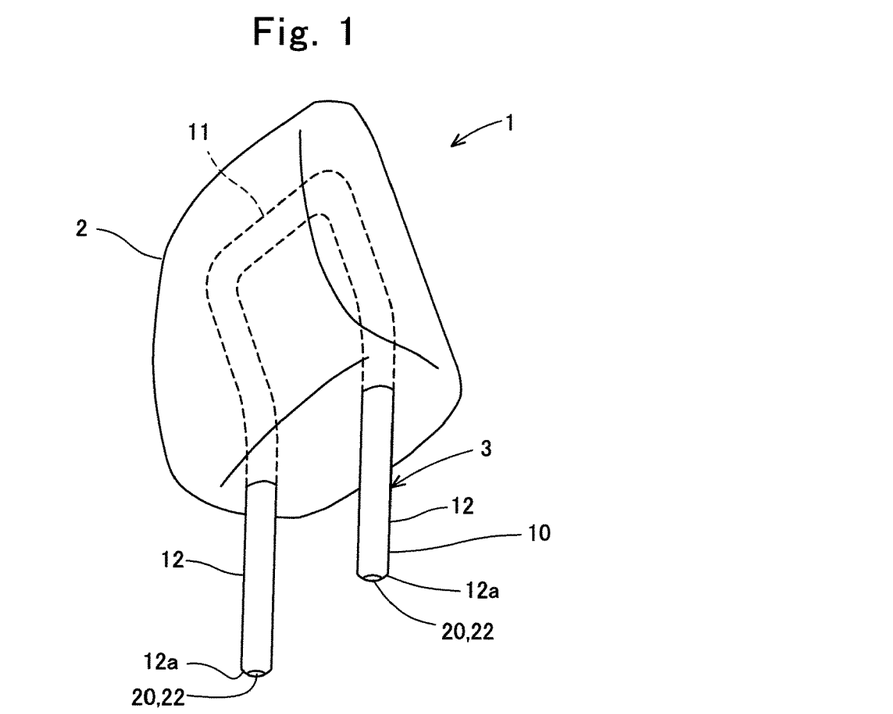
FIG. 1 is a perspective diagram of a headrest.

Explanations will be hereinafter made on the construction of a headrest 1 with reference to FIG. 1. The headrest 1 is installed to a vehicular seat back (not shown) at the upper end detachably in a sticking manner. The headrest 1 comprises a pillow 2 including a cushioning material therein, and a stay 3 (i.e., a stay for headrest) serving as a supporter member.

The stay 3 is formed as a letter-"U" shape. The stay 3 comprises paired legs that are stuck into the seat back at the upper end. The pillow 2 exposes the paired legs among the stay 3 on the leading end side, and is installed integrally around the other sites in the stay 3.

1-2 Construction of Stay 3

Figure 2:
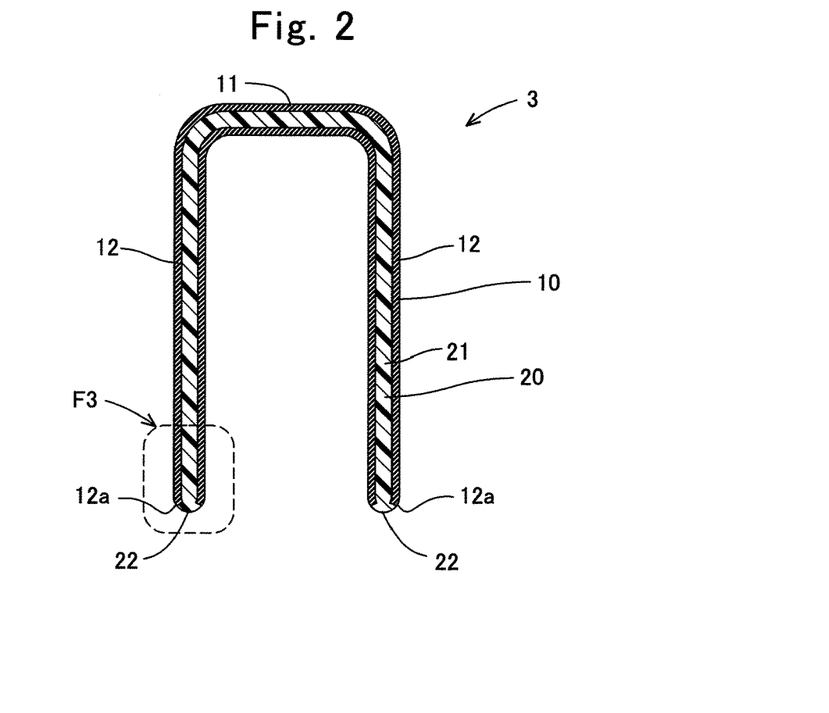
FIG. 2 is a cross-sectional diagram of a stay according to First Embodiment in the central axis direction.
Figure 3:
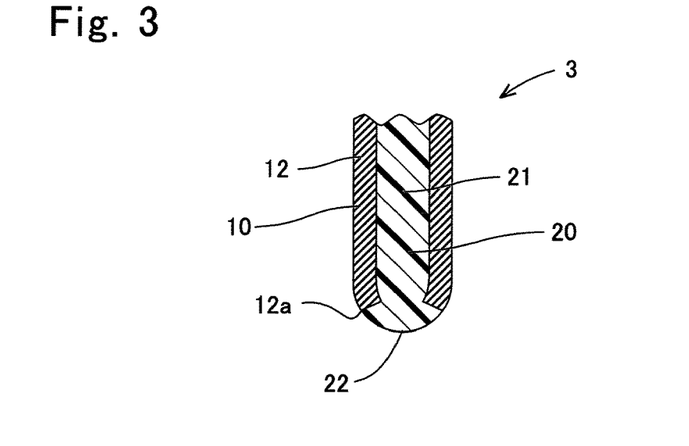
FIG. 3 is an enlarged diagram on section "F3" shown in FIG. 2 and a cross-sectional enlarged diagram of a leading end portion in the stay.

Explanations will be hereinafter made on a detailed construction of the stay 3 with reference to FIGS. 2 and 3. The stay 3 comprises a hollow metallic stay body 10, and an end installation body 20 arranged integrally into the stay body 10.

The stay body 10 is formed in a letter-"U"-shaped outer shape by a tubular metal-pipe material. The stay 10 includes a base 11, and paired legs (12, 12) extending respectively from opposite ends of the base 11. The paired legs (12, 12) are formed as a configuration whose intermediate section is bent slightly when the linear shape is taken as a reference, namely, as a letter-"L" configuration that is bent to make a large angle.

The legs (12, 12) are opened at the leading end (i.e., on an opposite side end across from the base 11). The legs (12, 12) are reduced radially at the leading end portions (12a, 12a) toward the central axis line. The leading end portions (12a, 12a) are formed so as to be free from any corners. That is, the leading end portions (12a, 12a) are not bent sharply at all, but are reduced radially gradually. For example, the leading end portions (12a, 12a) can be formed allowably as a spherical shape that is continuous from the linear section.

The end installation body 20 is formed by a polymeric material, and exhibits an arbitrary color or hue. For example, the end installation body 20 is formed by plastic or elastomer, and further exhibits a Shore-A hardness of "A50" or more (i.e., a hardness of 50 or more given by type-"A" durometer). The plastic can allowably be any of reactive plastic, such as foamed plastic, thermoplastic plastic, and thermosetting plastic. The elastomer can permissively be any of thermoplastic elastomer, and thermosetting elastomer.

The foamed plastic can be polyurethane foam, polypropylene foam, or polyethylene foam, and the like, for instance. The thermoplastic plastic can be polypropylene (or PP), nylon, polyacetal (or POM), acrylonitrile butadiene styrene resin (or ABS), polycarbonate (or PC), thermoplastic polyurethane (PU), or polyamide (or PA), and so forth, for instance. The thermosetting plastic can be thermosetting polyurethane (PU), epoxy resin (or EP), phenolic resin (or PF), and so on, for instance. The elastomer can be any of thermoplastic ones and thermosetting ones; and can be olefin-based elastomer (or TPO), polyurethane-based elastomer (or TPU), or ethylene-propylene-diene rubber (or EPDM), and the like, for instance.

The end installation body 20 includes a solid portion 21 formed integrally, and spherical portions (22, 22). That is, the solid portion 21, and the spherical portions (22, 22) are formed as an integral member by a material of the same species. The solid portion 21 is arranged inside a hollow interior in the leading end portions (12a, 12a) at least in such a state as being bonded. In the present embodiment, the solid portion 21 is filled not only in the leading end portions (12a, 12a), but also the paired legs (12, 12) over the entire length. That is, the solid portion 21 is bonded to the paired legs (12, 12) over the entire length. Moreover, the solid portion 21 is filled in another hollow interior in the base 11 as well. That is, the solid portion 21 is also bonded to the base 11.

Note that it is also allowable to fill the solid portion 21 in the paired legs (12, 12) alone but not to fill in the hollow interior in the base 11; or that it is even permissible to fill the solid portion 21 in some of the paired legs (12, 12) partially. Since the legs (12, 12) are reduced radially at the leading end portions (12a, 12a), the solid portion 21 is locked with respect to the leading end portions (12a, 12a) in the central axis direction of the leading end portions (12a, 12a). That is, the solidportion 21 maintains the state of being arranged inside the hollow interior in the leading end portions (12a, 12a). Moreover, due to being bonded to the leading end portions (12a, 12a) as well, the solid portion 21 maintains the state of being arranged inside the hollow interior in the leading end portions (12a, 12a).

The spherical portions (22, 22) protrude from the leading end portions (12a, 12a) respectively, and have a spherically-shaped surface. That is, the spherical portions (22, 22), which are formed by a polymeric material, are located at the foremost leading end of the stay 3. Moreover, the spherical portions (22, 22) are formed continuously from an outer peripheral rim in the leading end portions (12a, 12a) of the legs (12, 12). That is, the spherical portions (22, 22), and the leading end portions (12a, 12a) of the legs (12, 12) do not have any step or bump at the boundary between them, or they have a step or bump to such an extent that it falls within a minute range. That is, the spherical portions (22, 22), and the radially-reduced sections of the leading end portions (12a, 12a) form the leading ends of the stay 3 as a semi-spherical shape that does not have any dent or recess in the surface.

Note herein that the spherical portions (22, 22) maintain the state of being fixed to the leading end portions (12a, 12a) because of being formed as an integral member with the solid portion 21 by a material of the same species. Moreover, some of the spherical portions (22, 22) are integrated with the leading end portions (12a, 12a) of the legs (12, 12) in such a state as being bonded to end faces in the leading end portions (12a, 12a). This construction also makes the spherical portions (22, 22) maintain the state of being fixed to the leading end portions (12a, 12a).

Explanations will be hereinafter made on how to mold the end installation body 20. The end installation body 20 is integrated into the stay body 10 in such a state as being bonded to the stay body 10. For example, the end installation body 20 is integrated with the stay body 10 by insert molding. That is, the end installation body 20 is formed by injecting a material exhibiting fluidity into a mold (not shown) and then solidifying it under such a condition that the stay body 10 is arranged within the mold. First of all, the mold is formed so as to have cavities for forming the spherical portions (22, 22) between the mold and the leading end portions (12a, 12a) in the paired legs (12, 12) of the stay body 10. Not only the spherical portions (22, 22) are formed by injecting the material into the cavities, but also the solid portion 21 is formed by letting the material flow into the hollow interior in the legs (12, 12) through the opening in the leading end portions (12a, 12a). In this way, the end installation body 20 is molded integrally into the stay body 10.

1-3 Advantageous Effects

The foremost leading ends of the stay 3 are made as a spherical shape by the end installation body 20 that is formed by a polymeric material. Therefore, the stay 3 comes to have a highly safe configuration at the leading ends. Moreover, it is not necessary to form the metallic stay body 10 as a spherical shape at the leading end portions (12a, 12a). The stay body 10 can keep maintaining the tubular state at the leading end portions (12a, 12a). It is very easy and inexpensive to form the end installation body 20, which is formed by a polymeric material, as a spherical shape at the leading ends. In addition, since it is allowed that the metallic stay body 10 can keep maintaining the tubular state at the leading end portions (12a, 12a), the forming can be done with ease. Therefore, the stay 3 can be manufactured inexpensively while providing the leading ends with a highly safe configuration.

Moreover, it is possible to give an arbitrary color or hue to the end installation body 20 that is formed by a polymeric material. Since the spherical portions (22, 22) of the end installation body 20 protrude from the stay body 10, it is possible for an operator or worker to visually recognize the spherical portions (22, 22) of the end installation body 20. Consequently, it is possible to make the operator or worker distinguish between types of the stay 3 by making the color or hue of the end installation body 20 distinct in compliance with the types of the stay 3.

In addition, the solid portion 21 of the end installation body 20 is filled in the paired legs (12, 12) over the entire length. That is, the paired legs of the stay 3 include the paired legs (12, 12) of the metallic stay body 10, and the solid portion 21 filled in the hollow interior. Therefore, rigidity arising from the paired legs of the stay 3 against bending is a sum of rigidity arising from the stay body 10 and another rigidity arising from the solid portion 21. Accordingly, the stay 3 exhibits high rigidity. If the stay 3 according to the present embodiment should exhibit rigidity to such an extent as conventional metallic tubular stays do, it enables the stay body 10 to be made thinner in the thickness. Thus, it is possible to intend lowering the cost. Moreover, the end installation body 20, which is formed by a polymeric material, has a low specific gravity, compared with that of the metallic stay body 10. Consequently, it is possible to intend weight saving.

Moreover, the paired legs (12, 12) are reduced radially at the leading end portions (12a, 12a) toward the central axis line, and the solid portion 21 is locked to the leading end portions (12a, 12a) of the paired legs (12, 12) in the central axis-line direction. In this way, the end installation body 20 is arranged securely at a desired position in the paired legs (12, 12) of the stay body 10. That is, it is possible to put the spherical portions (22, 22) of the end installation body 20 in a state of being located continuously to follow the leading end portions (12a, 12a) of the paired legs (12, 12) reliably.

In addition, the end installation body 20 is integrated into the stay body 10. To put it in detail, the end installation body 20 is integrated into the stay body 10 in such a state as being bonded to the stay body 10. For example, the end installation body 20 is integrated with the stay body 10 by insert molding. In this way, the end installation body 20 is arranged more securely at a desired position in the paired legs (12, 12) of the stay body 10. That is, it is possible to put the spherical portions (22, 22) of the end installation body 20 more reliably in the state where it is located continuously to follow the leading end portions (12a, 12a) of the paired legs (12, 12).

Modified Embodiment of First Embodiment

Figure 4A:
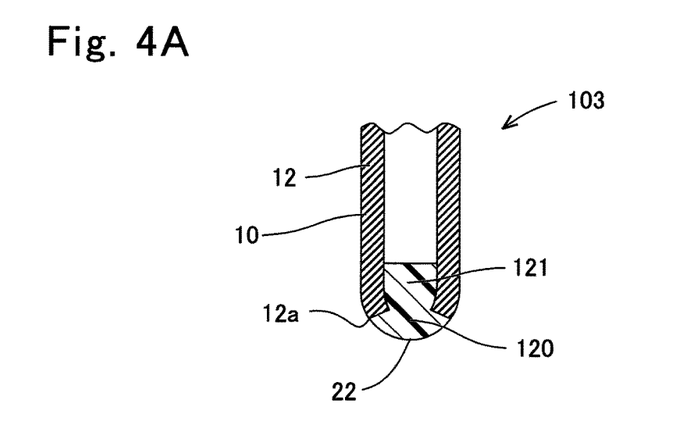
FIG. 4A is an enlarged cross-sectional diagram of a leading end portion in a stay according to an example of modified embodiments in First Embodiment.

Explanations will be hereinafter made on a stay 103 in a modified embodiment of First Embodiment with reference to FIG. 4A. Note that, in this stay 103, identical symbols are put as to the constituents that are identical with those of the stay 3 according to First Embodiment. As illustrated in FIG. 4A, the stay 103 comprises the stay 10, and an end installation body 120. The end installation body 120 includes a solid portion 121, and the spherical portion 22. The solid portion 121 is arranged only in some of the leg 12 partially. Moreover, the solid portion 121 is formed in a diameter that is larger than that of the opening in the leading end 12a. In addition, the end installation body 120 is formed as a constricted shape at the boundary between the solid portion 121 and the spherical portion 22 over the entire circumference.

Note herein that the end installation portion 120 is formed as a separate-body member that is independent of the stay body 10. The end installation 120, a separate-body member that is independent of the stay body 10, is inserted through the opening in the leading end portion 12a of the stay 10, and is then fixed in such a state as being fit into the leading end portion 12a. The solid potion 121 of the end installation body 120 has an outside diameter that is larger than an opening diameter of the leading end portion 12a. Consequently, the solid portion 121 is inserted into the hollow interior in the leading end 12a while being press fit.

Moreover, a section with the constricted configuration is located at an opening section in the leading end portion 12a. Since the solid portion 121 is arranged deep on an inner side than is the opening in the leading end portion 12a, it is locked with respect to the opening in the leading end portion 12a in the central axis-line direction. Therefore, the end installation body 120 is fixed in such a state as being fit into the leading end portion 12a of one of the paired legs (12, 12).

Note that the solid portion 121 can also allowably be put in a state of being press fit into the hollow interior in the leading end portion 12a, or can even permissibly be put in another state of not being press fit. The end installation body 120 is fixed to the leg 12 under a stable condition by putting the solid portion 121 in the state where it is press fit into the leading end portion 12a.

Figure 4B:
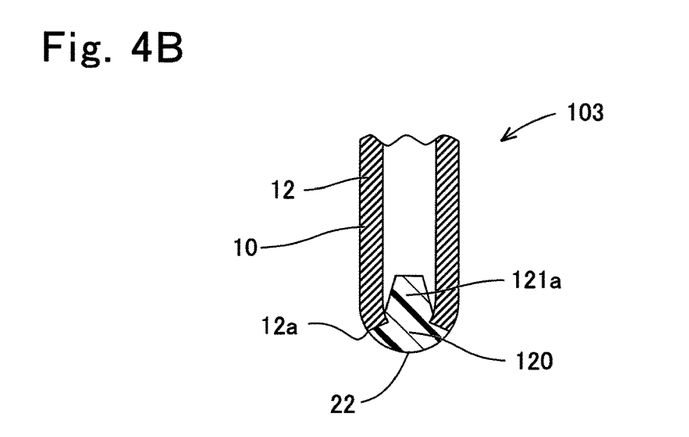
FIG. 4B is an enlarged cross-sectional diagram of a leading end portion in a stay according to another example of modified embodiments in First Embodiment.

In addition, instead of the solid portion 121 shown in FIG. 4A, it is also allowed that the end installation body 120 can be made so as to include a solid portion 121a shown in FIG. 4B. The solid portion 121a is formed so as to have a diameter that tapers as a whole, as it comes from a side of the spherical portion 22 to an opposite side across from the spherical portion 22, namely, as it comes toward an inner free-leading-end side of the solid portion 121a. Of the solid portion 121a, a section on a side of the spherical portion 22 is formed in a diameter that is larger than that of the opening in the leading end portion 12a of the stay body 10; of the solid portion 121a, another section on an opposite side across from the spherical portion 22 is formed in another diameter that is smaller than that of the opening in the leading end portion 12a of the stay body 10.

Therefore, upon fitting the solid portion 121a of the end installation portion 120 into the leading end portion 12a of the stay 10 through the opening, the solid portion 121a can be readily fit into the leading end portion 12a starting with the minor-diameter section. Then, the solid portion 121a is securely locked with respect to the opening in the leading end portion 12a at the major diameter portion in the central axis-line direction. Hence, the end installation body 120 can be easily installed to the leading end portion 12a, and can be reliably fixed to the leading end portion 12a. In this instance, the major-diameter section of the solid portion 121a can also allowably be put in a state of being press fit into the hollow interior in the leading end portion 12a, or can even permissibly be put in another state of not being press fit. The end installation body 120 is fixed to the leg 12 under a stable condition by putting the major-diameter section of the solid portion 121a in the state where it is press fit into the leading end portion 12a.

Moreover, in First Embodiment and its modified embodiments, the paired legs (12, 12) of the stay body 10 are reduced radially at the leading end portions (12a, 12a). In addition to this construction, it is also allowable that the leading end portions (12a, 12a) can be formed as such a configuration as not being reduced radially, and that the spherical portion 22 of the end installation portions (20, 120) can be made so as to protrude from the leading end portions (12a, 12a) in the shape of a sphere.

Second Embodiment

Figure 5:
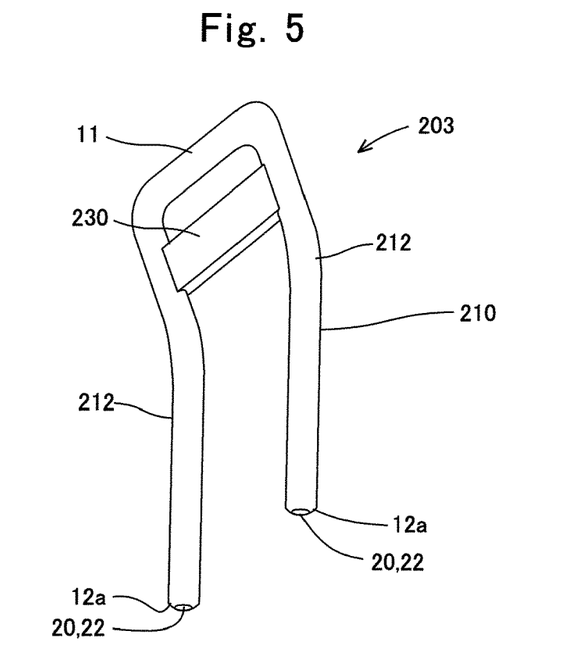
FIG. 5 is a perspective diagram of a stay according to Second Embodiment.
Figure 6:
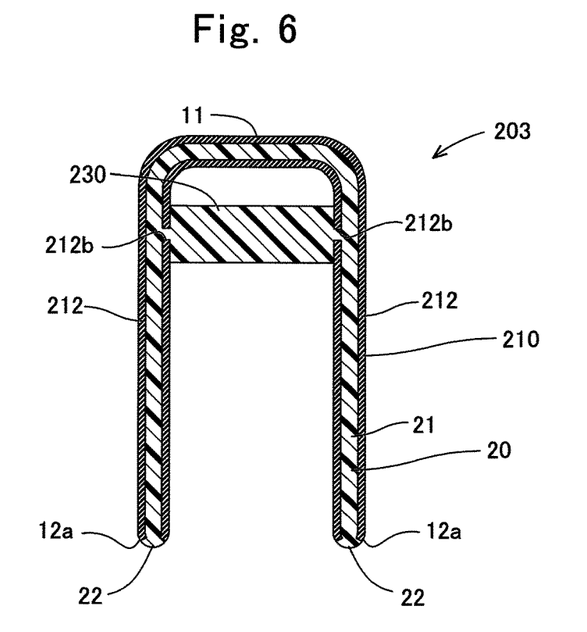
FIG. 6 is a cross-sectional diagram of the stay shown in FIG. 5 in the central axis direction.

Explanations will be hereinafter made on a stay 203 according to Second Embodiment with reference to FIGS. 5 and 6. Note that, in this stay 203, identical symbols are put as to the constituents that are identical with those of the stay 3 according to First Embodiment. As illustrated in FIGS. 5 and 6, the stay 203 comprises a stay body 210, the end installation body 20, and an outer installation body 230 serving as a connector member.

The stay body 210 includes the base 11, and paired legs (212, 212). In addition to the legs (12, 12) in First Embodiment, the legs (212, 212) further include holes or bores (212b, 212b) that are disposed at a site on a side of the base 11, and which are formed to penetrate the stay body 210 from the outer face to the inner face. The bores (212b, 212b) are formed respectively in one of the legs (212, 212) on the side that faces another one of the legs (212, 212). That is, the bore 212b in one of the legs (212, 212), and the bore 212b in the other of the legs (212, 212) face one another. Moreover, the positions of the bores (212b, 212b) are located inside the pillow 2 (shown in FIG. 1).

The outer installation body 230 is fixed to the stay body 210 on the outer face, and is formed by a polymeric material. The outer installation body 230 connects one of the legs (212, 212) with the other one of the legs (212, 212). To put it in detail, the outer installation body 230 connects the paired legs (212, 212) between the faces that face one another. The outer installation body 230 is formed by the same material as that of the end installation body 20. Moreover, the outer installation body 230 is integral with the end installation body 20 by way of the interior in the bores 212b, 212b). Therefore, the outer installation body 230, and the end installation body 20 are molded integrally into the stay body 210. That is, the outer installation body 230, and the end installation body 20 are integrated into the stay body 210 in such a state as being bonded to the stay body 210.

Explanations will be hereinafter made on how to mold the outer installation body 230 end installation body 20. The outer installation body 230 and end installation body 20 are integrated with the stay body 210 by insert molding. The outer installation body 230 and end installation body 20 are formed by injecting a material exhibiting fluidity into a mold (not shown) and then solidifying it under such a condition that the stay body 210 is arranged within the mold. First of all, the mold is formed so as to have the following cavities: first cavities for forming the spherical portions (22, 22) between the mold and the leading end portions (12a, 12a) in the paired legs (12, 12) of the stay body 10; and a second cavity for forming the outer installation body 230 between the mold and the outer peripheral faces of the paired legs (212, 212) at around the bores 212b, 212b). The spherical portions (22, 22) are formed by injecting the material into at least one of the first cavities and second cavity. Then, the solid portion 21 as well as the outer installation body 230 are formed by letting the material flow into the hollow interior in the legs (212, 212) through the opening in the leading end portions (12a, 12a). In this way, not only the end installation body 20 and outer installation body 230 are molded integrally into the stay body 210, but also the end installation body 20 and the outer installation body 230 become integral.

As described above, the stay 203 according to Second Embodiment comprises the outer installation body 230. The outer installation body 230 is fixed to the stay body 210 on the outer face, and is formed by a polymeric material. Moreover, the outer installation body 230 connects paired legs (212, 212) one another. The outer installation body 230 makes it possible to adjust a resonance frequency of the entire stay 203. That is, the stay 3 according to First Embodiment free of the outer installation body 230, and the stay 203 comprising the outer installation body 230 have resonance frequencies that differ from one another. In addition, the resonance frequency of the stay 203 is made variable by changing a range or extent of the installation between the outer installation body 230 and the stay body 210. In this way, when a vehicle is provided with the stay 203 on-board, it is possible to inhibit vibrations from arising by making the resonance frequency of the stay 203 adjustable.

Note herein that, in the above described Second Embodiment, the outer installation body 230 is made to connect the paired legs (212, 212) one another. In addition to this construction, it is also allowable that the outer installation body 230 can be made to connect one of the paired legs (212, 212) with the base 11. Moreover, it is even permissible that the outer installation body 230 can be made to connect the paired legs (212, 212) with the base 11. Even in any of these instances, a resonance frequency of the entire stay 203 changes.

Moreover, as described above, the stay body 210 includes the bores (212b, 212b) that are formed to penetrate the stay body 210 from the outer face to the inner face. In addition, the outer installation body 230 is integral with the end installation portion 20 by way of the interior in the bores (212b, 212b). In this way, a binding force, which the outer installation body 230 exerts to the stay body 210, can be secured fully. Moreover, the outer installation body 230 and end installation body 20 can be molded readily.

Third Embodiment

Figure 7:
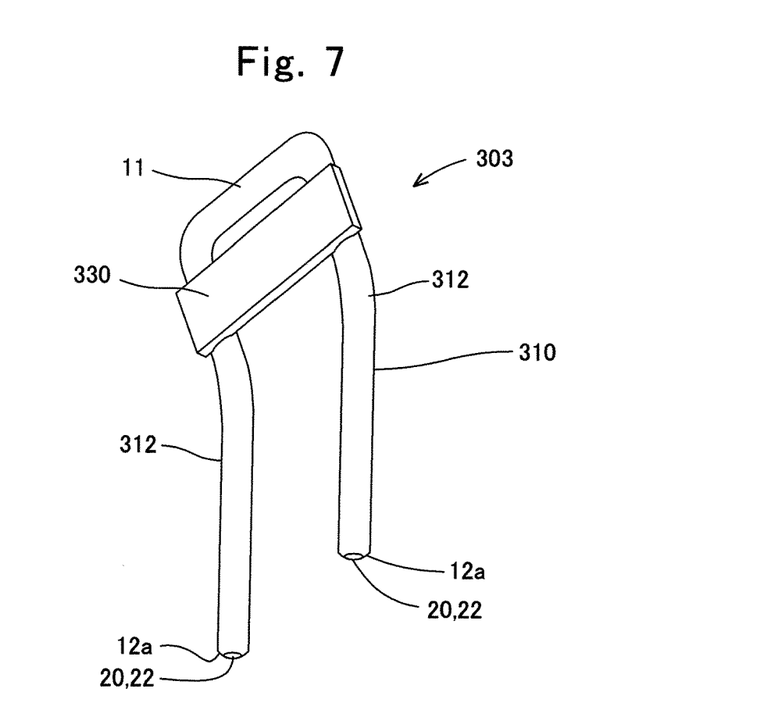
FIG. 7 is a perspective diagram of a stay according to Third Embodiment.
Figure 8:
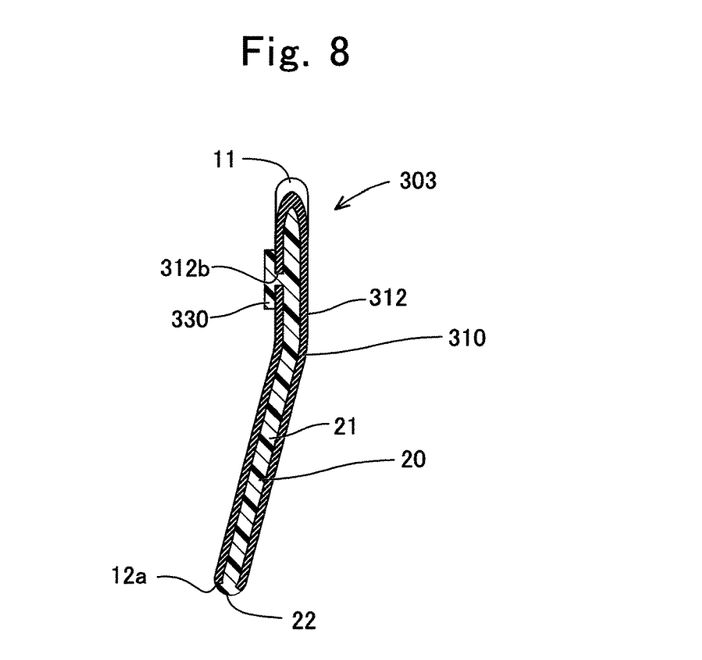
FIG. 8 is a cross-sectional diagram of only one of the legs of the stay shown in FIG. 7 in the central axis direction, and is a cross-sectional diagram taken by cutting the leg with an imaginary plane that passes through a headrest in the front/rear direction.

Explanations will be hereinafter made on a stay 303 according to Third Embodiment with reference to FIGS. 7 and 8. Note that, in this stay 303, identical symbols are put as to the constituents that are identical with those of the stay 3 according to First Embodiment. As illustrated in FIGS. 7 and 8, the stay 303 comprises a stay body 310, the end installation body 20, and an outer installation body 330 serving as a head protection plate and connector member.

The stay body 310 includes the base 11, and paired legs (312, 312). In addition to the legs (12, 12) in First Embodiment, the legs (312, 312) further include holes or bores (312b, 312b) that are disposed at a site on a side of the base 11, and which are formed to penetrate the stay body 310 from the outer face to the inner face. The bores (312b, 312b) are formed respectively in the legs (312, 312) on one of their sides that is directed to a front side of the headrest 1 (i.e., a vehicular front side).

The outer installation body 330 is fixed to the stay body 310 on the outer faces, and is formed by a polymeric material. The outer installation body 330 connects one of the legs (312, 312) with the other one of the legs (312, 312). To put it in detail, the outer installation body 330 connects the paired legs (312, 312) one another. The outer installation body 330 is formed by the same material as that of the end installation body 20. Moreover, the outer installation body 330 is integral with the end installation body 20 by way of the interior in the bores (312b, 312b). Therefore, the outer installation body 330, and the end installation body 20 are molded integrally into the stay body 310. That is, the outer installation body 330, and the end installation body 20 are integrated into the stay body 310 in such a state as being bonded to the stay body 310. For example, the outer installation body 330 and end installation body 20 are integrated with the stay body 310 by insert molding. A process for molding the outer installation body 330 and end installation body 20 in Third Embodiment is virtually the same as the process for molding the outer installation body 230 and end installation body 20 in Second Embodiment.

The stay 303 according to Third Embodiment effects the same advantages as the stay 203 according to Second Embodiment does. Moreover, the outer installation body 330 of the stay 303 is located so as to point toward a front side of the headrest 1. Therefore, the outer installation body 330 exists between the head of a passenger, who utilizes the headrest 1, and the metallic stay body 310. Hence, the outer installation body 330 protects the passenger's head.

Note that, although the outer installation body 330 in Third Embodiment is located on a front side of the stay body 310, it can also be located allowably on a rear side of the stay 310. In this instance, the outer installation body 330 protects the head of a passenger who sits on a rear seat. Moreover, the outer installation body 330 can even be located permissively on both of the front and rear sides of the stay 310, respectively. In this instance, the outer installation body 330 protects the head of a passenger who sits on a front seat, as well as the head of another passenger who sits on a rear seat.

What is claimed is:

1. A stay for headrest, the stay comprising:
a metallic hollow stay body formed as a letter-"U" shape including a base and paired legs extending respectively from opposite ends of the base; and
an end installation body formed of a polymeric material, and including a solid portion arranged inside a hollow interior in a leading end portion of the paired legs, and a spherical portion protruding from the leading end portion of the paired legs, wherein
the leading end portion of the paired legs includes a radially-reduced section reduced radially toward each of central axial lines of the paired legs in both of an inner peripheral face and an outer peripheral face thereof,
the outer peripheral face of the radially-reduced section forms part of a hemispherical shape,
the spherical portion of the end installation body is formed continually from an end in the outer peripheral face of the radially-reduced section, and forms a remaining other part of the hemispherical shape,
the radially-reduced section and the spherical portion form the hemispherical shape, and
the solid portion is locked to the inner peripheral face of the radially-reduced portion in a direction of the central axial lines.

2. The stay for headrest according to claim 1, wherein the solid portion is filled over an entire length of the paired legs.

3. The stay for headrest according to claim 1, wherein the end installation body is integrated into the stay body.

4. The stay for headrest according to claim 1, wherein the end installation body is fixed in such a state as being fit into the paired legs.

5. A stay for headrest, the stay comprising:
a metallic hollow stay body formed as a letter-"U" shape including a base and paired legs extending respectively from opposite ends of the base;
an end installation body formed of a polymeric material, and including a solid portion arranged inside a hollow interior in the paired legs, and a spherical portion formed integrally with the solid portion and protruding from a leading end portion of the paired legs; and
an outer installation body formed of a polymeric material, and fixed onto an outer face of the stay body, wherein
each of the paired legs includes a bore formed to penetrate from an outer face thereof to an inner face thereof, and
the outer installation body not only connects the paired legs with one another, but is also formed integrally with the solid portion by way of an interior in the bores.

6. The stay for headrest according to claim 5, wherein the outer installation body and the end installation body are formed of an identical polymeric material.

7. The stay for headrest according to claim 5, wherein the outer installation body is a head protection plate located to face toward any one of front and rear directions of the head rest.

8. A stay for headrest, the stay comprising:
a metallic hollow stay body formed as a letter-"U" shape including a base and paired legs extending respectively from opposite ends of the base;
an end installation body formed of a polymeric material, and including a solid portion arranged inside a hollow interior in the paired legs, and a spherical portion formed integrally with the solid portion and protruding from a leading end portion of the paired legs; and
an outer installation body formed of a polymeric material, and fixed onto an outer face of the stay body, wherein
at least one of the paired legs includes a first bore formed to penetrate from an outer face thereof to an inner face thereof,
the base includes a second bore formed to penetrate from an outer face thereof to an inner face thereof, and
the outer installation body not only connects at least one of the paired legs with the base, but is also formed integrally with the solid portion by way of an interior in the first bore and by way of an interior in the second bore.

9. The stay for headrest according to claim 1, wherein the end installation body is arranged in such a state as being bonded onto the hollow interior in the leading end portion of at least one of the paired legs among the stay body.

10. The stay for headrest according to claim 1, wherein the end installation body is colored in any colors in compliance with types of the stay for headrest.

11. The stay for headrest according to claim 1, wherein the end installation body includes the spherical portion integrated with the leading end portion of the paired legs in such a state that part of the spherical portion is bonded onto an end face of the leading end portion.

12. The stay for headrest according to claim 1, wherein:
the solid end portion is not only arranged inside the hollow interior in the paired legs alone, but also is formed to have a diameter that is larger than that of an opening in the leading end portion of the paired legs, and
the solid portion is provided with a constricted configuration over an entire circumference of an outer peripheral surface thereof at a boundary between the solid portion and the spherical portion.

* * * * *